(12) United States Patent
Furuhata et al.

(10) Patent No.: US 6,845,078 B2
(45) Date of Patent: Jan. 18, 2005

(54) OPTICAL PICKUP APPARATUS

(75) Inventors: Hitoshi Furuhata, Tokorozawa (JP);
Masayuki Koyama, Tokorozawa (JP);
Tomotaka Nishimura, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/679,361

(22) Filed: Oct. 7, 2003

(65) Prior Publication Data

US 2004/0070848 A1 Apr. 15, 2004

(30) Foreign Application Priority Data

Oct. 8, 2002 (JP) .................................... P2002-294470

(51) Int. Cl.$^7$ ................................................ G11B 7/00
(52) U.S. Cl. ................................ 369/112.23; 369/121
(58) Field of Search .......................... 369/44.32, 53.12, 369/53.19, 53.26, 112.01, 112.23, 112.24, 121, 124.03

(56) References Cited

U.S. PATENT DOCUMENTS 6,304,526 B1 * 10/2001 Nagashima et al. ..... 369/44.23
6,496,453 B2 * 12/2002 Asada et al. .............. 369/44.23
6,590,717 B2 * 7/2003 Sasano et al. ............... 359/717

* cited by examiner

Primary Examiner—Paul W. Huber
(74) Attorney, Agent, or Firm—Morgan, Lewis & Bockius LLP

(57) ABSTRACT

An optical pickup apparatus comprises a first light source for emitting a first laser beam having a first wavelength; a second light source for emitting a second laser beam having a second wavelength; and an objective lens for condensing the first laser beam and the second laser beam. The first light source and the second light source are disposed in positions in such a way that a total amount of coma aberration, which is generated on the first laser beam in accordance with a distance between the first light source and an optical axis of a whole optical system and coma aberration, which is generated on the first laser beam in accordance with a tilting amount of the objective lens becomes null, and a total amount of coma aberration, which is generated on the second laser beam in accordance with a distance between the second light source and said optical axis and coma aberration, which is generated on the second laser beam in accordance with the tilting amount of the objective lens becomes null.

3 Claims, 4 Drawing Sheets

H (α): IMAGE HEIGHT CHARACTERISTIC OF DVD
h (α): IMAGE HEIGHT CHARACTERISTIC OF CD
G (β): TILT CHARACTERISTIC OF DVD
g (β): TILT CHARACTERISTIC OF CD

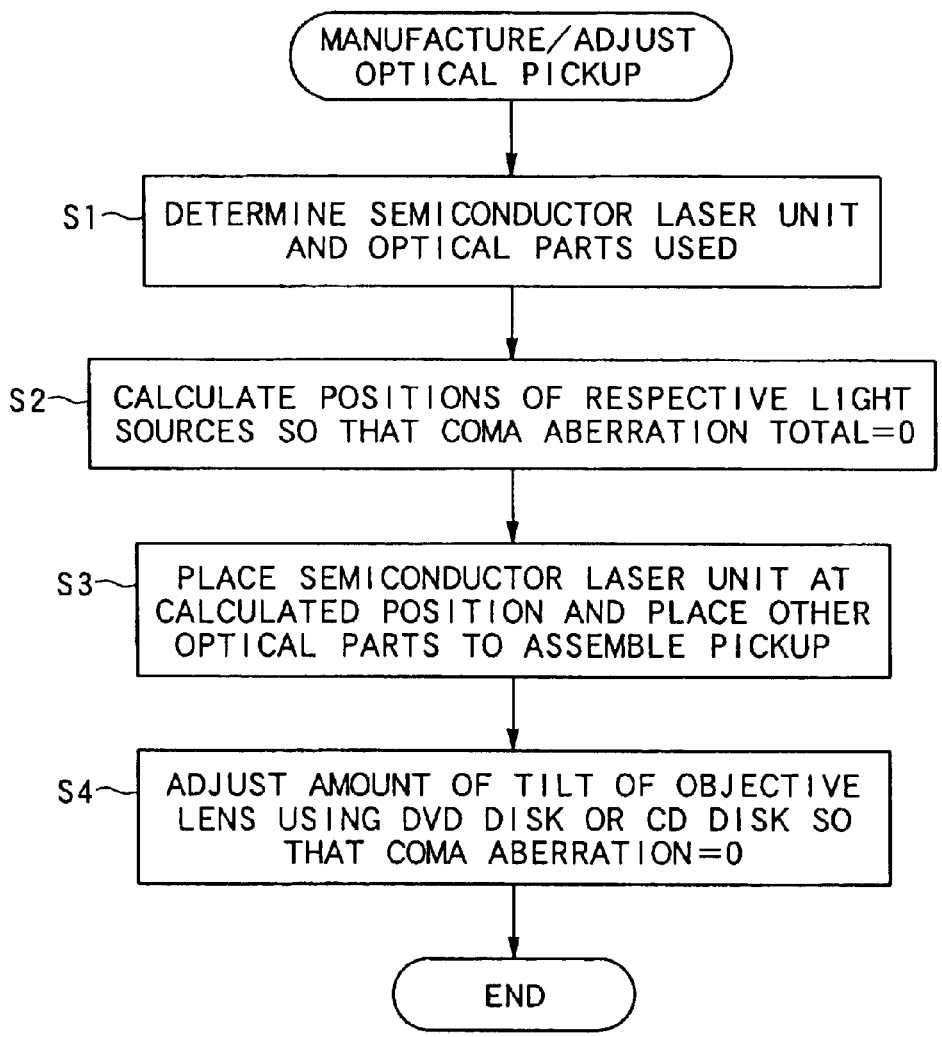

OPTICAL PICKUP APPARATUS

BACKGROUND OF THE INVENTION

1. Field of the Invention

The present invention relates to an optical pickup apparatus.

2. Description of the Related Art

As a light source of an optical pickup apparatus that reproduces an optical information recording medium such as a CD (Compact Disc) and DVD (Digital Versatile Disc), a semiconductor laser element is generally used. The wavelength of a laser beam as used and the number of apertures (NA) of the objective lens as used differ depending on whether a recording medium to be reproduced is a CD or DVD. For example, the wavelength of the laser beam is 650 nm and NA is 0.6 for a DVD. On the other hand, the wavelength of the laser beam is 780 nm and NA is 0.45 for a CD.

In order to allow a single player to reproduce both CD and DVD, an optical pickup apparatus incorporating a light source with two wavelengths of 650 nm and 780 nm has been under development and a semiconductor laser unit for emitting laser beams having two different wavelengths has been used in recent years in particular. This type of semiconductor laser unit includes a laser diode with a wavelength of 780 nm for a CD and a laser diode with a wavelength of 650 nm for a DVD, each of which is mounted in a single package.

When an optical pickup apparatus is constructed using the above described semiconductor laser unit with two wavelengths, the positional relationship between the central axis (optical axis) of the optical system extending from the light source to the disc and the light source is an important issue. Basically, placing the light source on the optical axis makes it possible to control occurrence of various types of aberration such as coma aberration. However, since the above described semiconductor laser unit with two wavelengths has two light sources for CD and DVD, it is physically impossible to place both lights sources on the optical axis. For this reason, many optical pickup apparatuses using a double-wavelength semiconductor laser unit include a CD light source provided on the optical axis and a DVD light source provided at a position shifted from the optical axis accordingly.

However, if the DVD light source is placed in a position shifted from the optical axis, the laser beam emitted from the DVD light source has a height of an image relative to the objective lens, thus causing coma aberration. Furthermore, the amount of coma aberration generated also varies depending on the design of the objective lens used, and therefore depending on the size of the objective lens used, coma aberration associated with the shape and position of the objective lens occurs in addition to coma aberration caused by an image height of the laser beam for DVD. As a result, the total amount of coma aberration grows considerably and deteriorates the optical characteristic of the optical pickup apparatus. This is an example of the problems to be solved by the present invention.

SUMMARY OF THE INVENTION

An optical pickup apparatus according to one aspect of the present invention comprises: a first light source for emitting a first laser beam having a first wavelength; a second light source for emitting a second laser beam having a second wavelength; and an objective lens for condensing the first laser beam and the second laser beam, wherein the first light source and the second light source are disposed in positions in such a way that a total amount of coma aberration, which is generated on the first laser beam in accordance with a distance between the first light source and an optical axis of a whole optical system and coma aberration, which is generated on the first laser beam in accordance with a tilting amount of the objective lens becomes null, and a total amount of coma aberration, which is generated on the second laser beam in accordance with a distance between the second light source and said optical axis and coma aberration, which is generated on the second laser beam in accordance with the tilting amount of the objective lens becomes null.

The optical pickup apparatus according to another aspect of the present invention comprises: a first light source for emitting a first laser beam having a first wavelength; a second light source for emitting a second laser beam having a second wavelength; a collimator lens for transforming the first laser beam and second laser beam to parallel beams; and an objective lens for condensing the parallel beams, wherein the first light source and second light source are disposed in positions in such a way that a total amount of coma aberration, which is generated on the first laser beam due to an image height relative to an optical axis of a whole optical system, which is generated in accordance with a first angle of incidence at which the first laser beam is launched into the collimator lens, and coma aberration, which is generated on the first laser beam in accordance with a tilting amount of the objective lens becomes null and a total amount of coma aberration, which is generated on the second laser beam due to an image height relative to said optical axis, which is generated in accordance with a second angle of incidence at which the second laser beam is launched into the collimator lens and coma aberration, which is generated on the second laser beam in accordance with the tilting amount of the objective lens becomes null.

The optical pickup apparatus according to further another aspect of the present invention comprises: a first light source for emitting a first laser beam having a first wavelength; a second light source for emitting a second laser beam having a second wavelength; a collimator lens for transforming the first laser beam and the second laser beam to parallel beams; and an objective lens for condensing the parallel beams, wherein a distance B between the second light source and an optical axis of a whole optical system is expressed by a following formula:

$$B = (g \cdot H \cdot A)/(g \cdot H - G \cdot h)$$

where "A" is a distance between the first light source and second light source, "B" is a distance between the first light source and the optical axis, "h" is an increasing rate in an amount of coma aberration of the first laser beam relative to a first angle of incidence "$\alpha 1 = \tan^{-1}(B/f)$" at which the first laser beam is launched into the collimator lens, "H" is an increasing rate in an amount of coma aberration of the second laser beam relative to a second angle of incidence "$\alpha 2 = \tan^{-1}((B-A)/f)$" at which the second laser beam is launched into the collimator lens, "g" is an increasing rate in an amount of coma aberration of the first laser beam relative to a tilt angle "$\beta$" of the objective lens and "G" is an increasing rate in an amount of coma aberration of the second laser beam relative to the tilt angle "$\beta$" of the objective lens.

BRIEF DESCRIPTION OF THE DRAWINGS

FIG. 4 is a flow chart showing a method for manufacturing/adjusting the optical pickup.

DETAILED DESCRIPTION OF THE PREFERRED EMBODIMENTS

Now, an embodiment of the present invention will be described below. In the embodiment described below, the present invention is applied to an optical pickup to reproduce both CD and DVD, but the present invention is also applicable to any recording media other than CD and DVD.

According to the present invention, in an optical pickup apparatus including a double-wavelength semiconductor laser unit, which emits a laser beam with a wavelength for CD and a laser beam with a wavelength for DVD, such a semiconductor laser unit is arranged in such a way that the total amount of coma aberrations generated associated with various factors becomes null. This prevents coma aberrations of the pickup apparatus as a whole and provides an optical pickup apparatus with a preferable optical characteristic.

Figure 1:
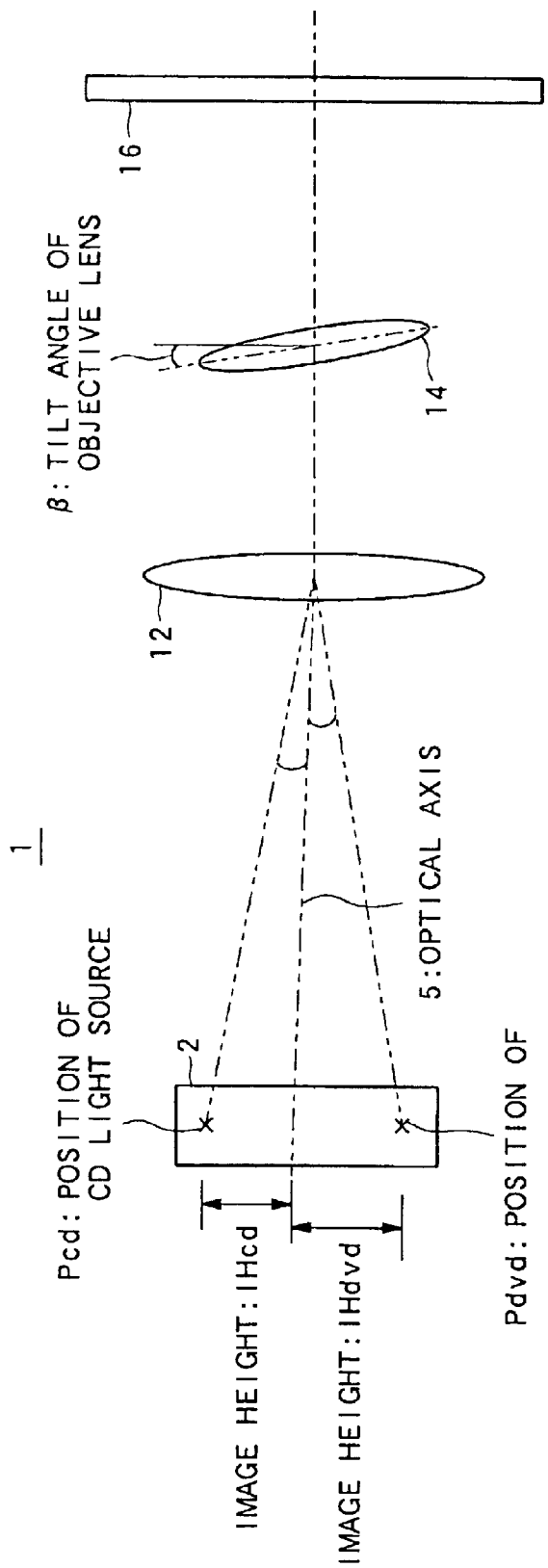
FIG. 1 is a schematic block diagram of an optical system of an optical pickup according to an embodiment of the present invention.

FIG. 1 shows a schematic block diagram of an optical system of the optical pickup apparatus 1 according to an embodiment of the present invention. In FIG. 1, a semiconductor laser unit 2 emits laser beams of two types of wavelength; one for a CD wavelength and the other for DVD wavelength as described above. The semiconductor laser unit 2 includes a CD semiconductor laser and a DVD semiconductor laser as light sources, which are disposed so as to be apart from each other by a predetermined distance in a predetermined package. In FIG. 1, the position of the CD light source is diagrammatically indicated as "Pcd" and the position of the DVD light source is also diagrammatically indicated as "Pdvd."

Furthermore, the optical pickup apparatus 1 is provided with a collimator lens 12 that transforms a laser beam, which is emitted from the semiconductor laser unit 2, into a parallel beam and with an objective lens 14 for condensing the parallel beam onto a disc 16. The objective lens 14 is provided on the same optical axis as that of the collimator lens 14. The tilt angle of the objective lens 14, that is, the inclination of the perpendicular line to an optical axis of the objective lens 14 relative to the vertical line is expressed by "β".

There is assumed that the semiconductor laser unit 2 having two light sources is placed in a predetermined position, as shown in FIG. 1. Since both the CD light source and DVD light source are located at respective positions deviated from the optical axis 5 of the whole optical system, the laser beam from the CD light source has an image height "IHcd" relative to the collimator lens 12, which corresponds to the distance between the CD light source and the optical axis 5 on the straight line perpendicular to the optical axis 5. Likewise, the laser beam from the DVD light source has an image height "IHdvd" relative to the collimator lens 12, which corresponds to the distance between the DVD light source and the optical axis 5 on the straight line perpendicular to the optical axis. The laser beam is launched from the CD light source into the collimator lens 12 at a certain angle of incidence due to the image height "IHcd" of the CD light source, with the result that coma aberration occurs on the laser beam that reaches the disc 16. Likewise, the laser beam is launched from the DVD light source into the collimator lens 12 at a certain angle of incidence due to the image height "IHdvd" of the DVD light source, with the result that coma aberration occurs on the laser beam that reaches the disc 16.

On the other hand, when the objective lens 14 is disposed with a tilt angle "β" relative to a perpendicular line to the optical axis 5, coma aberrations occur in the respective laser beams from the CD and DVD light sources, due to the above-mentioned tilt angle "β".

Thus, the coma aberrations that may occur according to the optical system structure having the double-wavelength semiconductor laser unit 2 may be classified into the following four types according to their causes:

(a) Coma aberration on the objective lens, which is associated with the angle of incidence on the collimator lens due to the image height on the CD light source side;

(b) Coma aberration on the objective lens, which is associated with the angle of incidence on the collimator lens due to the image height on the DVD light source side;

(c) Coma aberration associated with the tilting amount of the objective lens on the CD light source side, and (d) Coma aberration associated with the tilting amount of the objective lens on the DVD light source side.

Therefore, arranging the semiconductor laser unit in such a way that the total amount of these coma aberrations on the CD light source side becomes null and the total amount of coma aberrations on the DVD light source side becomes null can prevent occurrence of coma aberrations in the whole optical pickup apparatus. Based on such a technical concept, the embodiment of the present invention provides the optical pickup apparatus in which a positional determination of the semiconductor laser unit (more specifically, the CD light source and the DVD light source) ia made in such a way that the total amount of coma aberrations becomes null.

[Example]

Now, preferred examples of the present invention will be described below with reference to the accompanying drawings.

[Optical Pickup Apparatus]

Figure 2:
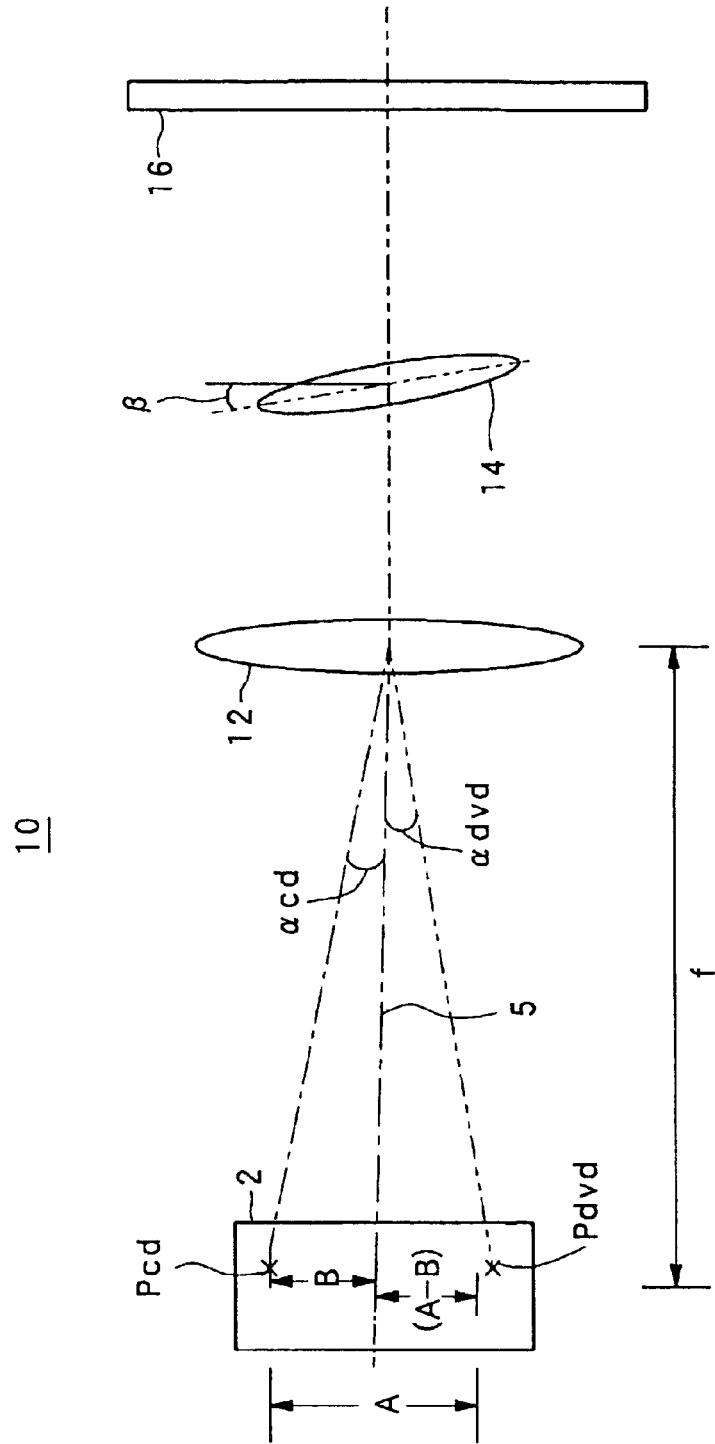
FIG. 2 is a view illustrating a configuration of the optical pickup according to an example of the present invention and a positional relationship between various components.

FIG. 2 shows a positional relationship of the optical system of the optical pickup apparatus according to an example of the present invention. As shown in FIG. 2, an optical pickup 10 includes a double-wavelength semiconductor laser unit 2. The position of the CD light source is indicated as "Pcd" and the position of the DVD light source is indicated as "Pdvd." Furthermore, a collimator lens 12 and an objective lens 14 are placed on an optical axis 5. The laser beams emitted from the CD light source and the DVD light source are transformed into parallel beams through the collimator lens 12 and condensed onto an information recording surface of a disc 16 by the objective lens 14.

The position "Pcd" of the CD light source and the position "Pdvd" of the DVD light source are kept away from each other by a predetermined distance "A" in the semiconductor laser unit 2. This predetermined distance "A" is determined by the positions of the semiconductor lasers for forming the respective light sources in the semiconductor laser unit 2 and the values concerning the positions of the semiconductor lasers are previously determined. In FIG. 2, the position "Pcd" of the CD light source is kept away from the optical axis 5 by a distance "B" on the straight line perpendicular to the optical axis 5. The position "Pcd" of the CD light source and the position "Pdvd" of the DVD light source are kept away from each other by the predetermined distance "A" as mentioned above, with the result that the position "Pdvd" of the DVD light source is kept away from the optical axis 5 by a distance (A−B).

In FIG. 2, the focal length of the collimator lens 12 is expressed by the reference symbol "f" and the tilt angle of the objective lens 14 is expressed by the reference symbol "β".

As described above, the coma aberrations that may occur according to the optical system structure having the double-wavelength semiconductor laser unit 2 may be classified into the following four types according to their causes:

(a) Coma aberration on the objective lens, which is associated with the angle of incidence on the collimator lens due to the image height on the CD light source side;
(b) Coma aberration on the objective lens, which is associated with the angle of incidence on the collimator lens due to the image height on the DVD light source side;
(c) Coma aberration associated with the tilting amount of the objective lens on the CD light source side, and
(d) Coma aberration associated with the tilting amount of the objective lens on the DVD light source side.

Of these coma aberrations, the amount of coma aberration associated with the angle of incidence on the collimator lens due to the image height is determined by the angle of incidence on the collimator lens, and can therefore be defined as a function of the angle of incidence. In addition, the amount of coma aberration associated with the objective lens is determined by the tilt angle thereof relative to the optical axis, and can therefore be defined as a function of the tilt angle of the objective lens. Thus, the above-described four types of amount of coma aberrations can be defined as follows:

(a) Amount of coma aberration on the objective lens, which is associated with the angle of incidence on the collimator lens due to an image height on the CD light source side:

$$Y=h(\alpha)$$

(b) Amount of coma aberration on the objective lens, which is associated with the angle of incidence on the collimator lens due to an image height on the DVD light source side:

$$Y=H(\alpha)$$

(c) Amount of coma aberration associated with the tilt of the objective lens on the CD light source side:

$$Y=g(\beta)$$

(d) Amount of coma aberration associated with the tilt of the objective lens on the DVD light source side:

$$Y=G(\beta)$$

where "α" is a value indicating the angle of incidence and more specifically, expressed by the angle of incidence at which the laser beam is launched from each light source into the collimator lens 12. On the other hand, "β" is a tilt angle of the objective lens 14 and more specifically, expressed by the angle of the objective lens 14 relative to a perpendicular line to the optical axis. The above-mentioned amounts of coma aberrations (a) and (b) are also called an "image height characteristic" and the amounts of coma aberrations (c) and (d) are called a "tilt characteristic".

Figure 3:
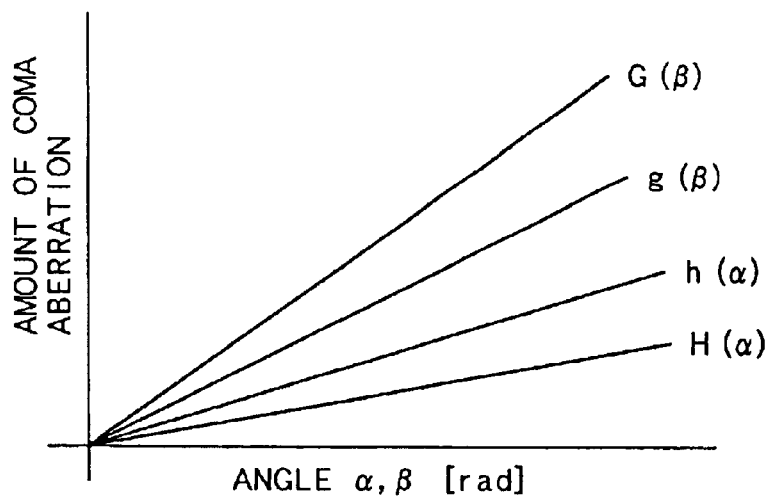
FIG. 3 is a view illustrating an example of an image height characteristic and tilt characteristic on the CD and DVD sides.

The above-described functions are determined by the characteristics of the collimator lens 12 and the objective lens 14. Therefore, if the collimator lens 12 and the objective lens 14 to be actually mounted on the optical pickup apparatus 1 are determined, it is possible to obtain each of the above-described functions by measuring the characteristics thereof. Examples of the respective functions are shown in FIG. 3. As illustrated, each function is basically a monotone increasing function or monotone decreasing function. If "α" and "β" are small, the inclinations thereof can often be regarded as a linear function. As shown in FIG. 3, the functions differ from each another. The double-wavelength semiconductor laser unit 2 is designed to be able to emit both laser beam with a wavelength for CD and laser beam with a wavelength for DVD, and therefore the image height characteristics and the tilt characteristics on the CD light source side and the DVD light source side differ from each another. Utilizing these facts, it is possible to reduce coma aberration to null by determining a value "B" (see FIG. 2) indicating the position of the semiconductor laser unit in such a way that the total amount of coma aberrations generated on the respective characteristics becomes null.

[Positional Determination of CD and DVD Light Sources]

Now, the actual method of positioning the semiconductor laser unit 2 will be described. There is assumed that the structure of the optical pickup apparatus 1, positions, angles and the other requirements of the structural components thereof are the same as those as shown in FIG. 2. When the objective lens 14 to be actually mounted on the optical pickup apparatus 1 is determined, each function illustrated in FIG. 3 can be obtained based on the characteristics thereof. Furthermore, when the collimator lens 12 to be actually mounted on the optical pickup apparatus 1 is determined, the focal length "f" thereof can be determined. In addition, when the semiconductor laser unit 2 to be actually mounted on the optical pickup apparatus 1 is determined, the distance "A" between the CD light source and DVD light source in the semiconductor laser unit 2 is also uniquely determined. That is, each function illustrated in FIG. 3, the focal length "f" of the collimator lens 12 and the distance "A" between the CD light source and DVD light source become known values.

The image height on the CD light source side relative to the collimator lens matches the distance "B" and the image height on the DVD light source side matches the distance "|A−B|", while the angle "α" formed by the position of each light source and the optical axis (the angle of incidence on the collimator lens) also matches the angle of incidence on the objective lens. More specifically, the angle of incidence "αcd" at which the laser beam is launched from the CD light source into the objective lens is expressed by the following formula:

$$\alpha cd=\tan^{-1}(B/f)$$

On the other hand, the angle of incidence of "αdvd" at which the laser beam is launched from the DVD light source into the objective lens is expressed by the following formula:

$$\alpha dvd=\tan^{-1}\{(B-A)/f\}$$

On the assumption that, when the DVD light source is operated, the tilt of the objective lens 14 is adjusted to reduce the coma aberration to null, the tilting amount "βdvd" of the objective lens 14 at that time satisfies the following formula:

$$G(\beta dvd)+H(\alpha dvd)=0$$

Therefore, the tilting amount "βdvd" may be expressed by the following formulae:

$$\beta dvd = G^{-1}\{-H(\alpha dvd)\}$$
$$= G^{-1}[-H\{\tan^{-1}((B-A)/f)\}]$$

In the optical pickup apparatus 1 according to the example of the present invention, even when the CD laser beam is used, the tilting amount of the objective lens 14 is the same as that in the case of the DVD laser beam. Accordingly, the requirement that the total amount of the coma aberration caused by the objective lens 14 and the coma aberration due to the image height becomes null will suffice as in the above-described case of "βdvd". More specifically, there will suffice satisfaction of the following formula:

$$g(\beta dvd)+h(\alpha cd)=0$$

Then, "$G^{-1}[-H\{\tan^{-1}((B-A)/f)\}]$" is substituted for "βdvd" in the formula to modify the above-mentioned formula into the following:

$$g[G^{-1}[-H\{\tan^{-1}((B-A)/f)\}]]$$
$$+h\{\tan^{-1}(B/f)\}=0 \quad \text{(Formula 1)}$$

Here, the values "A" and "f" are already determined as mentioned above. Furthermore, since each function is a monotone increasing function, the value "B" is determined uniquely. As shown in FIG. 2, the value "B" is the distance between the position of the CD light source and the optical axis on the straight line perpendicular to the optical axis. Accordingly, determination of the value "B" also causes determination of the value "(A–B)", i.e., the position of the DVD light source. When the CD light source and DVD light source are placed in their respective positions thus determined to form the optical pickup apparatus 1 and the tilt angle of the objective lens 14 is adjusted in an adjusting process for the DVD disc in such a way that the coma aberration becomes null, then the coma aberration on the CD light source side is also automatically reduced to null.

For simplicity, as illustrated in FIG. 3, when the respective functions are approximated as linear functions as follows:

$$H(\alpha)=H\cdot\alpha,\ h(\alpha)=h\cdot\alpha,\ G(\beta)=G\beta,\ g(\beta)=g\cdot\beta$$

then, the Formula 1 may be modified into the following:

$$-g\cdot H/G\cdot\tan^{-1}((B-A)/f)+h\cdot\tan^{-1}(B/f)=0$$

Here, assuming that the angles ((B–A)/f) and (B/f) are sufficiently small, the above mentioned formula can be approximated as:

$$-g\cdot H\cdot(B-A)/(G\cdot f)+h\cdot B/f=0$$

Therefore, there is provided the following formula:

$$B=(g\cdot H\cdot A)/(g\cdot H-G\cdot h)$$

From this, it is understood that the value B is constant.
[Method of Manufacturing/Adjusting Optical Pickup]

Now, the method for manufacturing/adjusting the optical pickup apparatus to which the present invention is applied will be described. FIG. 4 is a schematic flow chart of the method for manufacturing/adjusting the optical pickup apparatus. However, FIG. 4 shows only the processes concerning the arrangement of the semiconductor laser unit in this example.

First, a manufacturer determines a semiconductor laser unit and optical parts, etc., which are actually used for the optical pickup apparatus (Step S1). This makes it possible to obtain the distance between the CD light source and DVD light source in the semiconductor laser unit, the focal length of the collimator lens and characteristics of the respective functions of the objective lens, etc.

Then, based on the values and functions obtained, calculation steps are carried out according to the above described manner so that the total amount of coma aberrations becomes null and the positions of the CD light source and DVD light source are calculated (Step S2). Then, the manufacturer arranges the semiconductor laser unit so that the respective light sources are placed in the calculated positions and parts of the optical system are placed in position to assemble the optical pickup apparatus (Step S3).

Finally, the laser beam is emitted for the DVD disc or CD disc to detect the coma aberrations and the tilt angle "β" of the objective lens is adjusted so that the coma aberration becomes null. When the optical pickup apparatus is adjusted for the DVD disc so that the coma aberration becomes null, the coma aberration on the CD light source side automatically becomes null. Alternatively, when the optical pickup apparatus is adjusted for the CD disc so that the coma aberration becomes null, the coma aberration on the DVD light source side automatically becomes null. This is because the CD light source and DVD light source are positioned in step S2 so that the total of both coma aberrations becomes null, and the CD light source and DVD light source are placed in those positions in step S3. The optical pickup apparatus is manufactured and adjusted in this manner.

As described above, the optical pickup apparatus in this example is designed so that the CD light source and DVD light source are positioned in such a way that the coma aberrations produced due to the image height characteristic and the coma aberrations produced due to the tilt characteristic cancel out. It is therefore possible to provide the optical pickup apparatus with excellent optical characteristics, even when the double-wavelength semiconductor laser unit is used.

The present invention is described in the example of the optical pickup apparatus for the CD disc and DVD disc. However, the present invention may also be applicable to any recording media other than CD and DVD discs.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-294470 filed on Oct. 8, 2002 including the specification, claims, drawings and summary is incorporated herein by reference in its entirety.

What is claimed is:

1. An optical pickup apparatus comprising:
   a first light source for emitting a first laser beam having a first wavelength;
   a second light source for emitting a second laser beam having a second wavelength; and
   an objective lens for condensing the first laser beam and the second laser beam,
   wherein the first light source and the second light source are disposed in positions in such a way that a total amount of coma aberration, which is generated on the first laser beam in accordance with a distance between the first light source and an optical axis of a whole optical system and coma aberration, which is generated on the first laser beam in accordance with a tilting amount of the objective lens becomes null, and a total amount of coma aberration, which is generated on the second laser beam in accordance with a distance between the second light source and said optical axis and coma aberration, which is generated on the second laser beam in accordance with the tilting amount of the objective lens becomes null.

2. An optical pickup apparatus comprising:

a first light source for emitting a first laser beam having a first wavelength;

a second light source for emitting a second laser beam having a second wavelength;

a collimator lens for transforming the first laser beam and second laser beam to parallel beams; and an objective lens for condensing the parallel beams, wherein the first light source and second light source are disposed in positions in such a way that a total amount of coma aberration, which is generated on the first laser beam due to an image height relative to an optical axis of a whole optical system, which is generated in accordance with a first angle of incidence at which the first laser beam is launched into the collimator lens, and coma aberration, which is generated on the first laser beam in accordance with a tilting amount of the objective lens becomes null and a total amount of coma aberration, which is generated on the second laser beam due to an image height relative to said optical axis, which is generated in accordance with a second angle of incidence at which the second laser beam is launched into the collimator lens and coma aberration, which is generated on the second laser beam in accordance with the tilting amount of the objective lens becomes null.

3. An optical pickup apparatus comprising:

a first light source for emitting a first laser beam having a first wavelength;

a second light source for emitting a second laser beam having a second wavelength;

a collimator lens for transforming the first laser beam and the second laser beam to parallel beams; and an objective lens for condensing the parallel beams, wherein a distance B between the second light source and an optical axis of a whole optical system is expressed by a following formula:

$$B=(g \cdot H \cdot A)/(g \cdot H - G \cdot h)$$

where "A" is a distance between the first light source and second light source, "B" is a distance between the first light source and the optical axis, "h" is an increasing rate in an amount of coma aberration of the first laser beam relative to a first angle of incidence "$\alpha 1 = \tan^{-1}(B/f)$" at which the first laser beam is launched into the collimator lens, "H" is an increasing rate in an amount of coma aberration of the second laser beam relative to a second angle of incidence "$\alpha 2 = \tan^{-1}((B-A)/f)$" at which the second laser beam is launched into the collimator lens, "g" is an increasing rate in an amount of coma aberration of the first laser beam relative to a tilt angle "$\beta$" of the objective lens and "G" is an increasing rate in an amount of coma aberration of the second laser beam relative to the tilt angle "$\beta$" of the objective lens.

* * * * *